Figure 1:
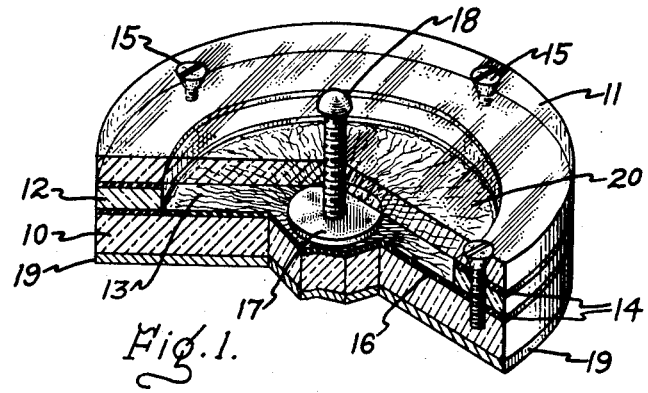

March 22, 1960   J. G. ANDERSON ET AL   2,929,672
VOLTAGE RECORDING DEVICE
Filed Oct. 24, 1957

Inventors,
John G. Anderson,
David C. Shampang,
by Gilbert P. Tarleton
Their Attorney.

ic patent office

2,929,672
Patented Mar. 22, 1960

2,929,672
VOLTAGE RECORDING DEVICE

John G. Anderson and David C. Shampang, Dalton, Mass., assignors to General Electric Company, a corporation of New York Application October 24, 1957, Serial No. 692,222

10 Claims. (Cl. 346—74)

This invention relates to the measurement of electrical quantities, and more in particular to an improved apparatus for recording the occurrence and magnitude of random transient voltages.

In the designing of electrical apparatus, it is frequently desirable to obtain knowledge of the conditions to which the apparatus may be subject in use. For this reason, many measuring devices have been provided in the past to record the occurrence and magnitude of transient voltages in the electrical systems. In many cases, however, the occurrence of such transient voltages is unpredictable, and therefore the measurement may involve the connections of the electrical measuring device to the electrical system for long periods of time.

The present invention relates to the type of measuring and recording device in which the indication of the presence of a transient voltage is in the form of a discharge pattern commonly known as a Lichtenberg figure. While voltage recording devices have been provided in the past that utilized the formation of Lichtenberg figures, these previous devices generally required the use of photographic film as the sensitive element. In order to determine whether or not discharge patterns were present in the film, it was therefore necessary to develop the film at periodic intervals. Such devices also required expensive light tight housings and special film handling processes. Such requirements increased the expense necessary to make the desired measurements, and the application of the devices were therefore limited.

It is therefore an object of this invention to provide an improved recording device for indicating the occurrence and magnitude of transient electrical quantities.

It is also an object to provide an economical surge voltage recorder wherein an indication is provided in the form of a Lichtenberg figure, and the device does not require the use of photographic film or other difficultly handled sensitive materials as the indicating medium.

It is a further object of this invention to provide a surge voltage recording device for indicating the occurrence and magnitude of surge voltages by Lichtenberg figures, the device being characterized by having the advantages that a permanent discharge pattern is formed and the pattern is readily visible without additional processing, the device is simply and economically constructed so that connection to an electrical system for extended periods of time, without maintenance, is practical, and the accuracy of the device is at least as good as previously described photographic film records.

Briefly stated, in accordance with one aspect of this invention, we provide an electric surge voltage recording device comprising an insulating plate having a layer of a highly viscous non-particulate insulating material (i.e., an insulating semisolid material) on one side thereof. One electrode is provided contacting the layer of semisolid materials and a conducting surface is provided on the other side of the plate. The device may be provided with a transparent cover over the side of the plate having the layer of semisolid material the cover serving to protect the semisolid surface from dirt, moisture and physical disturbances. The insulating plate may also be transparent to facilitate determination of the presence of a discharge pattern on the greased surface. While silicone grease is especially adaptable for use in the device as a result of its characteristics, such as being nonhydroscopic and maintaining its viscosity over a wide range of temperatures, other insulating semisolid materials of the proper viscosity may also be employed without departing from the spirit or scope of the invention.

While the specification concludes with claims particularly pointing out and distinctly claiming the subject matter which we regard as our invention, it is believed that the invention will be better understood from the following description taken in connection with the accompanying drawing.

Figure 2:
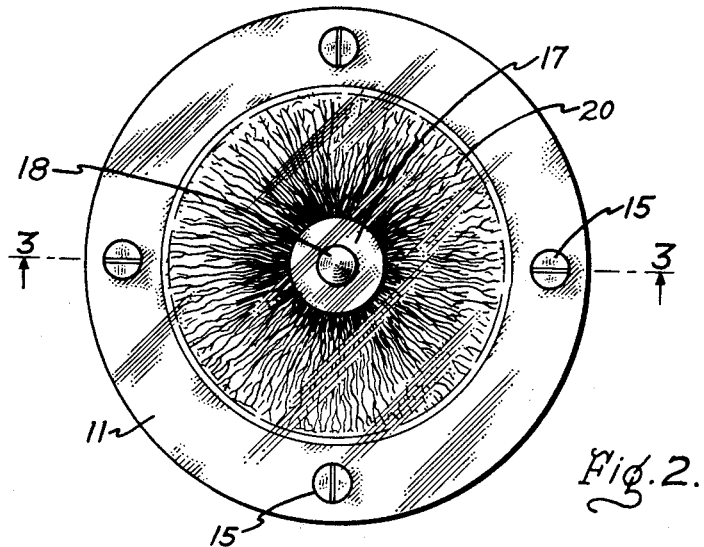
Figure 3:
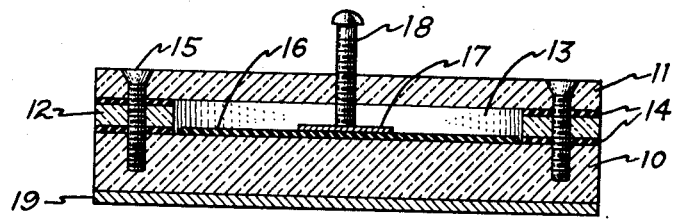

In the drawing:

Fig. 1 is a perspective partially cross-sectional view of one form of the surge voltage recorder of the present invention, and illustrating the formation of a Lichtenberg figure therein, Fig. 2 is a top view of the recording device of Fig. 1, and Fig. 3 is a cross-sectional view of the surge voltage recorder of Fig. 2 taken along the lines 3—3.

Referring now to the drawing, and more particularly to Fig. 1, therein is illustrated a surge voltage recorder comprising an insulating plate 10. The plate 10 is preferably circular, and may be a transparent plastic material. A transparent plate 11, which also may be of a plastic material, is provided covering the one side of the plate 10, and is separated from the plate 10 by an annular insulating spacer 12. The plates 10 and 11 and the spacer 12, define a sealed chamber 13, and suitable gaskets 14, may be provided between the plates and the spacer to prevent moisture or dust from entering the chamber. The assembly may be held together by screws 15, extending between the plates through the spacer 12.

A layer 16 of highly viscous non-particulate insulating material, hereinafter referred to as an insulating semisolid material, is provided on the surface of the plate 10 within the chamber 13. One electrode, such as a metallic disc 17, is provided contacting the surface of the material 16 within the chamber 17, the disc 17 preferably being disposed centrally in the chamber 13. Connecting means such as a screw 18 is provided extending through the cover plate 11 to provide an external connection to the disc 17. It will be understood, of course, that other forms of electrodes, such as point contacts, may be employed to contact the grease layer. A conducting surface, such as a metallic plate 19, is provided contacting the side of the plate 10 opposite the semisolid material layer 16.

If a high voltage electrical surge of greater than about 5 kilovolts is applied between the screw 18 and the plate 19, electrical discharges will form at the edges of the disc electrode 17, and these discharges will move out over the semisolid surface. The electrostatic forces produced by these discharges will cause a discharge pattern to be formed on the semisolid surface if the material has the proper viscosity. A representation of a typical discharge pattern in the layer of material 16 is illustrated by the lines 20 in Figs. 1 and 2. The diameter of this pattern increases with an increase in applied voltage, and thus indicates the maximum voltage occurring at the terminals of the device. Since the plate 11 is transparent, this discharge pattern can be easily seen and measured. In order that the visibility of the discharge pattern will be greater it is also preferred that the plate 10 be transparent and removable from the conducting surface 19.

In order that a permanent record be obtained, the viscosity of the semisolid material 16 should be high enough that the material will not flow together to erase the pattern. Similarly, the material should have a low enough viscosity that the electrostatic forces produced by the voltage surge can form the pattern in the material. Thus, the proper viscosity of the material may be easily determined by one skilled in the art.

In order to apply the layer of semisolid material 16 to the plate 10, the material may be thinned with a suitable vaporizable solvent to permit the material to be flowed in an even coat over the surface of the plate 10. Evaporation of the solvent then leaves the layer of semisolid material adhering to the surface of the plate 10. As an alternative, of course, the material may be simply applied by rubbing it on the surface of plate 10 with the finger.

As has been previously stated, it is preferred that the insulating semisolid material 16 is a silicone grease (i.e., a silicone fluid, for example, of the type disclosed in U.S. Letters Patents 2,469,888 and 2,469,890 which issued on applications of W. I. Patnode and are assigned to the assignee of the present invention, in combination with a silica filler), since this type of grease has the desirable characteristic that it is nonhydroscopic, and maintains its viscosity over a wide temperature range. It shall be understood, of course, that other types of insulating semisolid materials may also be employed. The silicone grease may be thinned with a silicone oil to provide the proper viscosity. For example, a suitable dielectric material for the layer 16 was obtained by mixing 400 grams of an insulating silcone grease of the type disclosed in U.S. Letters Patent No. 2,428,608, Shailer L. Bass, and having a penetration of 190–250 at 25° C., with 70 cc. of a chain stopped methyl polysiloxane having a viscosity of 1000 centistoke at 25° C. This mixture was then combined with five pounds of carbon tetrachloride to facilitate application of the dielectric material to the plate 10, and the carbon tetrachloride was evaporated leaving a smooth layer of the dielectric material on the plate.

In view of the simplicity of construction of the recording device of this invention, the device may be economically left connected to an electrical circuit for extended periods of time, and little or no maintenance of the device is required. The occurrence of an electrical surge voltage at the terminals of the device results in a permanent discharge pattern on the semisolid surface, and this pattern is easily visible through the transparent cover. When silicone grease is employed, the discharge pattern is stable over a wide range of temperatures, and is not affected by the occurrence of moisture.

Since the discharge pattern is permanent, the visual examination of the device to determine the occurrence and magnitude of surge voltages that have occurred need only be periodic. After a pattern has been recorded, the discharge pattern may be readily smoothed out and the device used over again. The accuracy of the recording device has been found to be at least as good as the accuracy of photographic film recorders, and calibration of the device to determine the magnitude of voltage surges may be made either before or after a surge has occurred. The device will respond to surge voltages reaching crest value in less than a microsecond, and the discharge pattern is not influenced by the duration of the applied voltage. The pattern gives a clear indication of the polarity of the surge voltage, and it can record magnitudes of both polarities for an oscillatory voltage.

If desired, photographic records of the semisolid material pattern may be readily made because of the transparency of the device. In this event, it may be desirable that the plate 10 be transparent and removable from the conducting plate 19.

It will be understood, of course, that while the form of the invention herein shown and described constitutes the preferred embodiment of the invention, it is not intended herein to illustrate all of the possible equivalent forms or ramification thereof. It will also be understood that the words used are words of description rather than of limitation, and that various changes may be made without departing from a spirit or a scope of the invention herein disclosed, and it is aimed in the appended claims to cover all such changes as fall within the true spirit and scope of the invention.

What we claim as new and desire to secure by Letters Patent of the United States is:

1. An electric device comprising an insulating plate means, a layer of insulating semisolid material on one side of said plate means, electrode means in direct physical contact with said layer, and a conducting surface means on the other side of said plate means.

2. Surge voltage recording means comprising insulating plate means, a layer of insulating semisolid material on one side of said plate means, transparent means covering said side of said plate means, electrode means extending through said transparent means and contacting said layer of semisolid material, and conducting surface means on the other side of said plate means.

3. Surge voltage recording means comprising insulating plate means, transparent cover means covering one side of said plate means, said cover means and plate means defining a sealed chamber, a layer of insulating semisolid material on said plate means within said chamber, electrode means extending through said cover means and contacting said layer of semisolid material, and conducting surface means on the other side of said plate means.

4. Surge voltage recording means comprising transparent insulating plate means, transparent cover means covering one side of said plate means, said cover means and plate means defining a sealed chamber, a layer of insulating semisolid material on said plate means within said chamber, electrode disc means contacting a central portion of said layer of semisolid material within said chamber, means extending through said cover means providing an external connection to said disc means, and conducting surface means on the other side of said plate means.

5. The recording means of claim 4 in which said insulating material is a silicone grease.

6. Means for forming discharge patterns in response to voltage surges comprising transparent insulating plate means, a layer of silicone grease on one side of said plate means, electrode means contacting a central portion of said layer, conducting surface means on the other side of said plate means, and means for impressing a voltage surge between said electrode means and conducting surface.

7. Surge voltage recording means comprising insulating plate means, transparent cover means covering one side of said plate means, said cover means and plate means defining a sealed chamber, a layer of insulating semisolid material on said plate means within said chamber, electrode means extending through said cover means and contacting said layer of semisolid material, and surface conducting means on the other side of said plate means, the viscosity of said semisolid material being sufficiently low that discharge patterns will form therein but sufficiently high that said discharge patterns will be retained.

8. The recording means of claim 7 in which said insulating material is a silicone grease.

9. The recording means of claim 7 in which said insulating plate means is transparent.

10. The new use of silicone grease to record the magnitude and polarity of a transient voltage, which comprises applying a layer of said grease to one side of a dielectric plate, contacting a portion of the surface of said grease with an electrode, contacting the other side of said plate with a conducting surface, and applying said voltage between said electrode and surface.

References Cited in the file of this patent

UNITED STATES PATENTS 2,858,181   Ortlieb _____ Oct. 28, 1958

FOREIGN PATENTS 486,394   Canada _____ Sept. 9, 1952